United States Patent Office 3,640,949
Patented Feb. 8, 1972

3,640,949
PRODUCTION OF FLAME RETARDANT POLYPROPYLENE COMPOSITIONS
Darwin Allen Dalzell, Alma, Mich., assignor to Michigan Chemical Corporation, St. Louis, Mich.
No Drawing. Filed Apr. 29, 1969, Ser. No. 820,286
Int. Cl. C08f 45/60
U.S. Cl. 260—45.75 R                     8 Claims

ABSTRACT OF THE DISCLOSURE

Polypropylene is rendered flame retardant without impairing its physical properties by incorporating in it an additive comprised of tetrabromophthalic anhydride, a fumed silica, and antimony trioxide or an equivalent antimony compound.

---

The present invention relates to the production of polypropylene compositions rendered fire retardant or self-extinguishing by incorporating therein a fire retardant additive comprised of tetrabromophthalic anhydride, a silica-containing thixotropic agent, and antimony trioxide or an equivalent antimony compound.

Polypropylene can be produced by diverse processes and therefore, depending upon the purpose for which the product is intended, its physical properties may be varied rather widely. For instance, through the use of stereo selective catalysts, the molecular configuration of the polymer chains as they build up during polymerization may be determined so that the resulting polymer is regular or substantially so. The isotactic polymer, which is the one most commonly used, is characterized by a structure having the methyl groups of the monomeric units occupying the same relationship in space along the chain. Isotactic polypropylene has a high degree of crystallinity and thus has an exceptionally high melting point. It has greater rigidity than high density polyethylene and also possesses considerable surface hardness and good heat resistance. It is almost unlimited in its flexibility and is easy to process. Also, blending, reinforcing, and copolymerizing has produced specialty grades of polypropylene such as asbestos-filled, antistatic and heat stabilized grades.

Polypropylene is used primarily for the injection molding of various products, and the molded parts have excellent physical properties such as high surface hardness and the absence of stress cracking. The molded parts are used in a wide variety of industries, such as interior trim for automotive vehicles, electrical appliances, in the electronics industry as well as in various industrial, commercial and household products. However, polypropylene can also be used for the production of fibers, films and for the extrusion of sheet or in connection with wire coating and the production of pipe.

Since it is a polyolefin and does not possess a real high molecular weight, polypropylene possesses the distinct disadvantage of burning quite easily. As a result, unless the polypropylene polymer is rendered flame retardant, its uses have been seriously curtailed. In fact, flame retardancy is becoming an important consideration in the selection of materials of construction, especially in the electronics and electrical applications field and in the field of filaments or fibers useful in apparel or textiles. An effective fire retardant for polypropylene and, in particular, a satisfactory additive for rendering it fire retardant, is therefore needed more and more.

In selecting such an additive, it not only must be effective, but the desirable physical properties of the polypropylene must not be substantially impaired. It has been particularly difficult to provide a suitable fire retardant additive or mixture of additives which can accomplish this. Also, due to the homopolar character of the olefinic polymers including polypropylene, and due to the polarity of most known flame retarding agents, few of the latter even qualify as suitable candidates for solving the problem. The most commonly used fire retardant for polypropylene has been a chlorinated paraffin in combination with antimony trioxide. While it is possible to obtain rather satisfactory flame resistant properties utilizing these additives, a very large amount of additive must be used so that important physical properties of the polypropylene, particularly its tensile strength, are seriously impaired. An additional disadvantage of the chlorinated paraffins is to be found in their tendency to split off hydrogen chloride which, of course, attacks the polypropylene as well as the machinery and equipment involved in processing it.

According to the present invention, difficultly flammable polypropylene compositions can be made advantageously by blending with the virgin polypropylene, tetrabromophthalic anhydride, a silica type thixotropic agent and antimony trioxide or an equivalent antimony compound. In place of some of the tetrabromophthalic anhydride, other brominated organic compounds may be used and certain other fire retardants may be added if desired such as a chlorinated paraffin. However, the tetrabromophthalic anhydride, the thioxtropic agent and the antimony-containing compound are required if the advantages of the present invention are to be realized. The present fire retardant additives may be blended with any of the various polypropylenes produced by the different methods briefly mentioned above and additives other than fire retardant ones may be included in the polypropylene without having their effectiveness impaired or the physical properties of the polypropylene adversely affected.

By way of further illustration of the invention, the examples referred to in Table I are provided; but are not to be construed as limiting. Unless otherwise indicated, the parts specified in such examples are parts by weight. The compositions of these examples were prepared according to the following procedure: virgin polypropylene and the particular additive or additives of the example in question were blended in a Braebender mixer ("Plasti-Corder," Torque Rheometer, C. W. Braebender Instruments, Inc., 50 E. Wesley St., South Hackensack, N.J.). This mixer possesses a pair of sigma blades in a heated head, and for purposes of the present invention was operated at a mixing speed of 60 r.p.m. at approximately 220° C. for a six minute cycle. The polypropylene and the additives were mixed in the proportions referred to in Table I, and a suitable amount was selected to provide approximately a 40 gram quantity for each such sample. The particular virgin polypropylene used for these experiments was Hercules H6523 (Hercules Powder Company, Wilmington, Del.). This particularly polypropylene is a general purpose grade; that is, it contained no special material such as asbestos filling or the like. After the mixing operation was completed, the composition was removed from the mixer and placed in a suitable mold and pressed at ambient temperatures to a thickness as nearly 0.125 inch as possible. This sheet was then cut into bars or strips (⅛" x ½" x 5") suitable in size for the flame retardant test ASTM test method D 635–63, ASTM Standards 1965, Part 27, pages 177 to 180 inclusive, published by the American Society for Testing and Materials, 1916 Race St., Philadelphia, Pa.

TABLE I.—COMPOSITIONS

| Ingredients | 1 | 2 | 3 | 4 | 5 | 6 | 7 | 8 | 9 | 10 |
|---|---|---|---|---|---|---|---|---|---|---|
| Polypropylene | 100 | 90 | 65 | 60 | 60 | 60 | 60 | 69 | 65 | 60 |
| Tetrabromophthalic anhydride | | 25 | 20 | 20 | 15 | 15 | | | 15 | 10 |
| Tetrachlorophthalic anhydride | | | | | | | | | 10 | 10 |
| NH₄Br | | | | 10 | | | 10 | 21 | | 10 |
| NH₄Cl | | | | | 10 | | | | | |
| "Dechloran" [1] | | | | | | 15 | | | | |
| Hexabromocyclododecane | | | | | | | 5 | | | |
| "Cab-O-Sil" [2] | | 5 | 5 | 5 | 5 | 5 | 5 | 5 | 5 | 5 |
| Sb₂O₃ | | 5 | 5 | 5 | 5 | 5 | 5 | 5 | 5 | 5 |

[1] A dimer of hexachlorocyclopentadiene $(C_{10}C)_{12}$, Hooker Chemical Corp., Niagara Falls, N.Y.
[2] A fumed silica, Cabot Corp., 125 High St., Boston, Mass. See comments hereinafter on fumed silica.

The compositions of Table I may be varied, especially in that the proportions of their ingredients may be changed within limits. However, it is recommended that such ingredients come within the following ranges (parts by weight): tetrabromophthalic anhydride 10–30; tetrachlorophthalic anhydride 10–20; ammonium bromide or chloride 10–25; hexabromocyclododecane 5–10; "Dechloran" 10–20; "Cab-O-Sil" 2–8; and antimony trioxide 2–8. Also, other ingredients may be used while obtaining the advantages of the invention. In fact, a chemist skilled in this art may select such ingredients for his particular composition and use them in proportions best suited for his purpose. He could replace a part of the tetrabromophthalic anhydride with one or more of the fire retardant ingredients of Table I, or he could replace it in part with different but appropriate bromine-containing hydrocarbons such as pentabromotoluene, brominated diphenyl, tri or pentabromodiphenyl ether, tri or pentabromoanisole, hexabromobenzene, tribromophenol, and pentabromophenyl allyl ether.

However, the total fire retardant additive utilized in a given composition should fall within the range of 25 to 45 parts by weight; and inasmuch as compositions of the present invention should contain tetrabromophthalic anhydride, a silica-containing thixotropic agent, and antimony trioxide or its equivalent, as explained hereinbefore, it follows that a minimum of 10 parts by weight of tetrabromophthalic anhydride should be utilized together with a minimum of 2 parts of the silica-containing thixotropic agent and a minimum of 2 parts of antimony trioxide or an equivalent antimony compound.

Fumed silica has been especially recommended as the thixotropic material. Fumed silica is a particular kind of silica characterized by a large surface area which may range from as much as 400 square meters per gram to 50 square meters per gram. Fumed silica has little, if any, internal surface area and is not a porous or a gelatinous silica. It can be produced by various processes although it is usually produced in the vapor phase at elevated temperatures—thus the term "fumed" silica. For example, it may be produced by the hydrolysis of silicon tetrachloride at temperatures exceeding 1100° C. Fumed silica has been used as a thickening agent for increasing the viscosity of fluids, and has also found acceptance in treating powdered inorganic salts to render them free flowing. It has also been added to high polymers, particularly foamed rubber systems. It is used in the polypropylene polymers of the present invention, however, not so much to control viscosity as to render the material non-dripping. Untreated polypropylene would surely drip at elevated temperatures so that even if rendered non-burning, it would be unsatisfactory as the hot drippings would be a hazard. It has not been suggested heretofore, it is believed, that a relatively small amount of fumed silica could accomplish this non-dripping especialy when compared with the large amounts of various fillers for polypropylene, such as talc, which are often used.

Antimony trioxide has been especially recommended as the antimony-containing compound. However, equivalent antimony-containing compounds may be used, such as antimony trisulfide, antimony catechol, antimony phosphate, antimony oxychloride, and alkyl antimonates. When using antimony compounds equivalent to antimony trioxide, the parts by weight should be adjusted so that the antimony in the compound utilized provides in the composition approximately the amount of antimony which would have been there had antimony trioxide been used.

It has also been suggested that some flame retardant materials may be added in addition to the tetrabromophthalic anhydride, thixotropic agent, and antimony-containing compound of the present invention, and that these may well include chlorinated waxes. If chlorinated waxes are so added, materials containing between 65% and 75% chlorine, by weight, are preferred.

The fire retardancy test ASTM D 635–63 referred to hereinbefore was specially devised for determining the relative flammability of rigid plastics in the form of sheets or molded bars. The rate of burning will vary with the thickness and test data should be compared with data for a control material of known performance and of comparable thickness. The tests were conducted in a hood and each specimen was clamped to a laboratory ring stand in a horizontal position with its transverse axis inclined at a 45° angle to the horizontal. A piece of 20 mesh Bunsen burner gauze was placed under the test specimen. A standard Bunsen burner was adjusted to produce a blue flame approximately one inch in height. For each attempt to ignite the specimen, the Bunsen burner was so placed that the tip of the flame contacted the end of the specimen. At the end of thirty seconds, the Bunsen burner was removed. In case the plastic did not continue to burn after the first ignition, the burner was placed in contact with the free end of the specimen for a second period of thirty seconds immediately after the specimen ceased to burn.

If the specimen did not ignite on the two attempts, the result is judged to be "non-burning" by this test. If the specimen continues to burn after the first or second ignition, and burns to the four inch mark, it is judged to be burning by this test. If the specimen does not burn to the four inch mark after the first or second ignition, it is judged to be "self-extinguishing" by this test. Four inches minus the unburned length from the clamped end measured along the lower edge determines the extent of burning by this test. However, none of the materials tested burned to the second gage mark. Accordingly, in order to secure some comparison between the specimen tested with respect to burn time, the time of the after-flaming was measured; that is, the time which the specimen continued to burn after the first or second ignition. Naturally the longer it burned, the more flammable the material. "Burn Time," Table II, refers to the time of such after-flaming. Test data for the examples of Table I, as well as some comparative data with certain polypropylenes of commerce are provided in Table II.

TABLE II.—TEST DATA

| Example No. | Physical properties | | Flame retardancy | |
|---|---|---|---|---|
| | Tensile strength, p.s.i. | Heat distortion, ° C. | Burn time, seconds | Distance burned, inches |
| 1 | 4,860 | 68 | (¹) | (²) |
| 2 | | | (¹) | (³) |
| 3 | 2,810 | 81 | 8 | <1 |
| 4 | 2,060 | 74 | 0 | <1 |
| 5 | 3,180 | 73 | 0 | <1 |
| 6 | 2,710 | 80 | 2 | <1 |
| 7 | | | 1 | <1 |
| 8 | | | 28 | <1 |
| 9 | 2,800 | 85 | 10 | <1 |
| 10 | 2,200 | 83 | 1 | <1 |
| 11 | 2,610 | 82 | 5 | <1 |
| 12 | 2,960 | 82 | 4 | <1 |
| 13 | 2,590 | 84 | 3 | <1 |
| 14 | | | 50 | 2 |

¹ Rapid consumption.
² Drip.
³ Slight drip.

For Examples 1–10 inclusive, see Table I for formulations. Example 11, Enjay 185—Enjay Chemical Company, 60 W. 49th St., New York, N.Y.; Example 12, Avisun 2356—Avisun Corporation, 21 S. Twelfth St., Philadelphia, Pa.; Examples 13 and 14, Allied 1050 and 1060 respectively—Allied Chemical Corporation, Plastic Division, Morristown, N.J. In Examples 11–14 inclusive, fire retardant grades of polypropylene marketed by the producers mentioned were utilized. They were recommended particularly for injection molding.

What is claimed is:

1. A difficultly flammable polypropylene plastic material having incorporated therein a flame retardant composition comprising tetrabromophthalic anhydride, finely divided silica and an antimony-containing compound, said flame retardant composition constituting from 25 to 45 parts by weight of said plastic material.

2. A difficultly flammable polypropylene plastic material according to claim 1 wherein said antimony-containing compound is antimony trioxide.

3. A difficultly flammable polypropylene plastic material according to claim 1 wherein said tetrabromophthalic anhydride constitutes from 10 to 25 parts by weight of said plastic material.

4. A difficultly flammable polypropylene plastic material according to claim 1 wherein said finely-divided silica is fumed silica and which constitutes from 2 to 8 parts by weight of said plastic material.

5. A difficultly flammable polypropylene plastic material according to claim 2 wherein said antimony trioxide is present from 2 to 8 parts of said plastic material.

6. In a polypropylene plastic material containing at least one member selected from the group consisting of tetrachlorophthalic anhydride, ammonium bromide, ammonium chloride, a dimer of hexachlorocyclopentadiene and hexabromocyclododecane, the improvement of rendering said plastic material difficultly flammable by incorporating therein a fire retardant composition comprising tetrabromophthalic anhydride, finely-divided silica and an antimony-containing compound, said fire retardant composition constituting from 25 to 45 parts by weight of said plastic material.

7. A difficultly flammable plastic material according to claim 6 wherein said antimony-containing compound is antimony trioxide.

8. A difficultly flammable plastic material according to claim 6 wherein said fire retardant composition is composed of 10–25 parts tetrabromophthalic anhydride, 2–8 parts fumed silica, and 2–8 parts antimony trioxide.

References Cited

UNITED STATES PATENTS

| | | | |
|---|---|---|---|
| 3,093,599 | 6/1963 | Tamm | 260—45.7 |
| 3,158,588 | 11/1964 | Johnson | 260—45.75 |
| 3,311,585 | 3/1967 | Edlin | 117—137 |
| 3,334,063 | 8/1967 | Berliner | 260—41 |
| 3,354,191 | 11/1967 | Stivers | 260—448 |

FOREIGN PATENTS

| | | | |
|---|---|---|---|
| 652,896 | 3/1965 | Belgium | 260—45.9 |

DONALD E. CZAJA, Primary Examiner

V. P. HOKE, Assistant Examiner

U.S. Cl. X.R.

252—8.1 R; 260—41 A, 45.7 R, 45.8 A, 45.9 R